US012636222B2

(12) United States Patent
Zhong

(10) Patent No.: US 12,636,222 B2
(45) Date of Patent: May 26, 2026

(54) MULTIFUNCTIONAL MASSAGE DEVICE

(71) Applicant: ODECO LIMITED, Shenzhen (CN)

(72) Inventor: Huiming Zhong, Shenzhen (CN)

(73) Assignee: ODECO LIMITED, Shenzhen (CN)

( * ) Notice: Subject to any disclaimer, the term of this patent is extended or adjusted under 35 U.S.C. 154(b) by 706 days.

(21) Appl. No.: 18/157,085

(22) Filed: Jan. 20, 2023

(65) Prior Publication Data

US 2023/0210712 A1 Jul. 6, 2023

Related U.S. Application Data

(63) Continuation of application No. PCT/CN2022/076851, filed on Feb. 18, 2022.

(30) Foreign Application Priority Data

Dec. 31, 2021 (CN) ......................... 202111669641.2

(51) Int. Cl.
*A61H 9/00* (2006.01)
*A61H 23/00* (2006.01)

(52) U.S. Cl.
CPC ......... *A61H 9/0057* (2013.01); *A61H 23/006* (2013.01); *A61H 2201/0153* (2013.01);
(Continued)

(58) Field of Classification Search
CPC .... A61H 9/005–0071; A61H 23/00–06; A61H 2201/0153; A61H 2201/1215;
(Continued)

(56) References Cited

U.S. PATENT DOCUMENTS

| | | | |
|---|---|---|---|
| 5,377,701 A | 1/1995 | Fang | |
| 2022/0175612 A1* | 6/2022 | Witt ....................... | A61H 19/30 |

(Continued)

FOREIGN PATENT DOCUMENTS

| | | | |
|---|---|---|---|
| CN | 109793638 A | 5/2019 |
| CN | 209422410 U | 9/2019 |

(Continued)

OTHER PUBLICATIONS

International Search Report issued in corresponding International application No. PCT/CN2022/076851, mailed Sep. 21, 2022.

(Continued)

*Primary Examiner* — Paige Kathleen Bugg
(74) *Attorney, Agent, or Firm* — David & Raymond Patent Firm; Raymond Y Chan

(57) ABSTRACT

A multifunctional massage device includes: a housing; a massage portion, capable of being protruded from the housing or being recessed to the housing; a drive mechanism, disposed in the housing, wherein an output end of the drive mechanism is connected to the massage portion, and the drive mechanism is configured to drive the massage portion to reciprocate; and a telescope mechanism, disposed in the housing and connected to the drive mechanism, wherein the telescope mechanism is configured to drive the drive mechanism to telescope in the housing, and drive, by the drive mechanism, the massage portion to transition between being protruded from the housing and being recessed to the housing.

13 Claims, 10 Drawing Sheets

(52) U.S. Cl.
CPC ................ *A61H 2201/1215* (2013.01); *A61H 2201/123* (2013.01); *A61H 2201/149* (2013.01)

(58) Field of Classification Search
CPC ........ A61H 2201/123; A61H 2201/149; A61H 19/00–50; A61H 7/008
USPC ........................................................ 601/6–11
See application file for complete search history.

(56) References Cited

U.S. PATENT DOCUMENTS

| | | | | |
|---|---|---|---|---|
| 2022/0331198 | A1* | 10/2022 | Dietrich | A61H 23/02 |
| 2022/0409470 | A1* | 12/2022 | He | A61H 9/0057 |

FOREIGN PATENT DOCUMENTS

| | | | |
|---|---|---|---|
| CN | 113017711 | A | 6/2021 |
| CN | 215081855 | U | 12/2021 |
| CN | 217067010 | U | 7/2022 |

OTHER PUBLICATIONS

Written Opinion of the International Searching Authority for No. PCT/CN2022/076851.

* cited by examiner

MULTIFUNCTIONAL MASSAGE DEVICE

CROSS-REFERENCE TO RELATED APPLICATIONS

This application a continuation application of International Application No. PCT/CN2022/076851, filed on Feb. 18, 2022, which claims priority to Chinese Patent Application No. 2021116696412, filed before China National Intellectual Property Administration on Dec. 31, 2021 and entitled "MULTIFUNCTIONAL MASSAGE DEVICE," the disclosure of which is incorporated herein by reference in its entirety.

TECHNICAL FIELD

The present disclosure relates to the technical field of massage devices, and in particular, relates to a multifunctional massage device.

BACKGROUND

In daily life, people are pursuing higher and higher quality of life. In addition to meeting people's basic necessities of life including food, clothing, shelter and transportation, people's sensory enjoyment also needs to be accommodated. With acceleration of work and life rhythms, physical and mental fatigue is easily caused. Therefore, various massage devices come into being to eliminate fatigue, stretch skin or muscle, and achieve a health-care effect. Conventional massage devices are capable of massaging various parts of the body. However, the conventional massage devices have a single massage mode, and the massage is usually carried out by vibration tapping, resulting in a poor massage experience.

SUMMARY

An object of the present disclosure is to provide a multifunctional massage device to solve the technical problem that the conventional massage device has a poor massage effect and experience.

A multifunctional massage device includes:

a housing;

a massage portion, capable of being protruded from the housing or being recessed to the housing;

a drive mechanism, disposed in the housing, wherein an output end of the drive mechanism is connected to the massage portion, and the drive mechanism is configured to drive the massage portion to reciprocate; and a telescope mechanism, disposed in the housing and connected to the drive mechanism, wherein the telescope mechanism is configured to drive the drive mechanism to telescope in the housing, and drive, by the drive mechanism, the massage portion to transition between being protruded from the housing and being recessed to the housing.

Compared with the related art, the embodiments of the present disclosure mainly achieve the following beneficial effects:

In the multifunctional massage device, the massage portion is made to be in contact with the part to be massaged, and the drive mechanism controls, via the connection rod, the movable wall to reciprocate. In this way, tapping massage or suction massage is carried out on the part to be massaged. In the case that the massage portion is protruded from the housing, the drive mechanism controls, via the connection rod, the movable wall to reciprocate, such that the movable wall is capable of carrying out tapping massage on the part to be massaged. In the case that the massage portion is recessed to the housing, the drive mechanism drives, via the connection rod, the movable wall to reciprocate to change the volume of the first chamber, such that a suction force is produced in the first chamber to carry out suction massage on the part to be massaged in the massaging recess. By carrying out tapping massage or suction massage on the part to be massaged, fatigue is relieved, the skin or muscle is stretched, and a health-care effect is achieved. By transition between tapping massage and suction massage, comfort of massage may be improved, the massage effect may be greatly improved, blood circulation of the part to be massaged may be promoted, stimulation and joy of massage may be increased, and the effect of relieving the whole body may be achieved.

BRIEF DESCRIPTION OF THE DRAWINGS

For clearer descriptions of technical solutions according to the embodiments of the present disclosure, drawings that are to be referred for description of the embodiments are briefly described hereinafter. Apparently, the drawings described hereinafter merely illustrate some embodiments of the present disclosure. Persons of ordinary skill in the art may also derive other drawings based on the drawings described herein without any creative effort.

Figure 1:
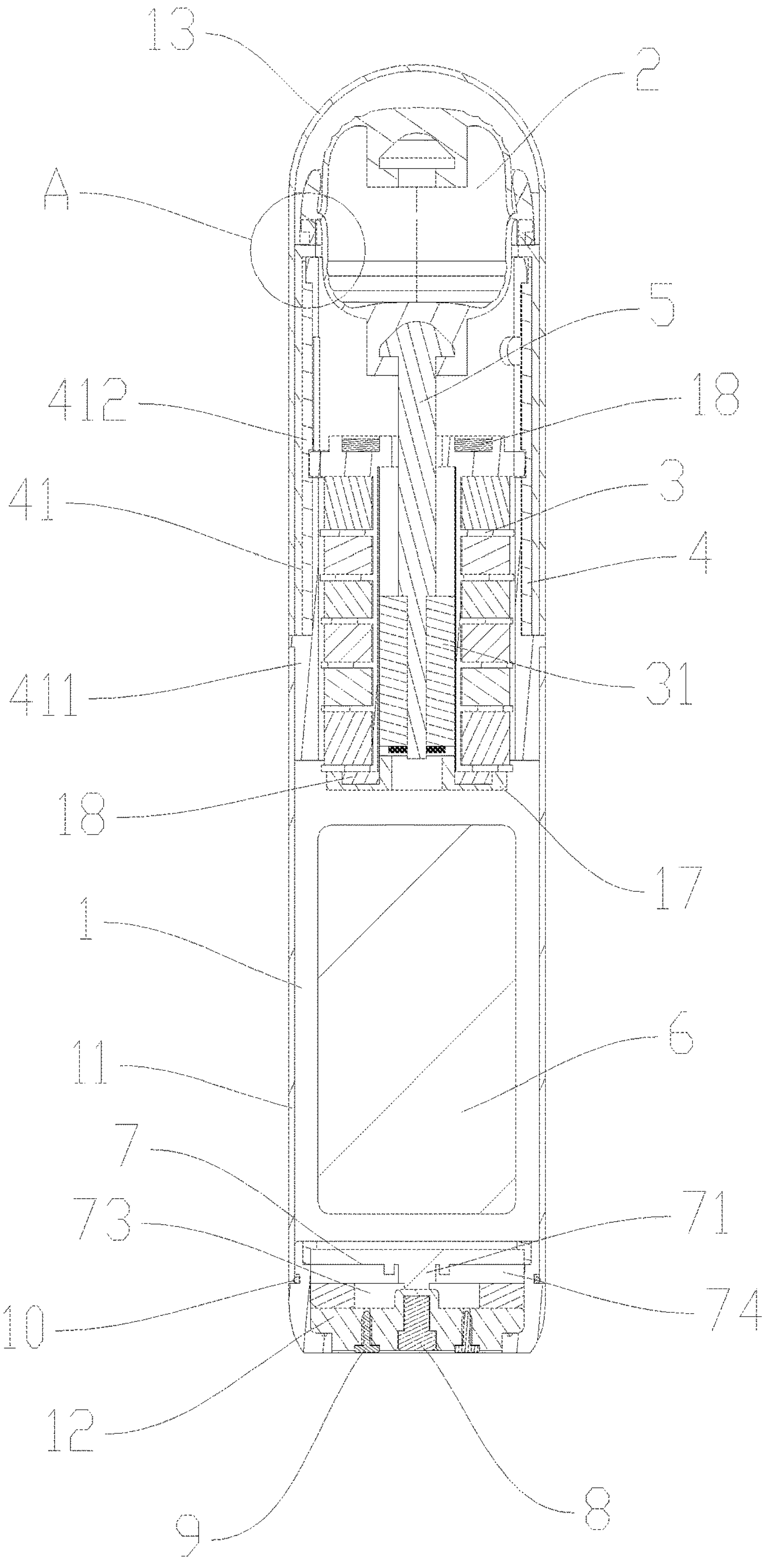
FIG. 1 is a schematic structural view of a multifunctional massage device according to a first embodiment of the present disclosure.

Reference numerals and denotations thereof:

1—housing; 11—gripping portion; 12—tail cover; 13—top cover; 14—upper housing; 15—lower housing; 16—silicone sleeve; 2—massage portion; 21—fixed circumferential wall; 211—snap fastener; 22—movable wall; 221—connection hole; 23—connection circumferential wall; 24—first chamber; 25—opening; 26—extension circumferential wall; 3—drive mechanism; 31—electromagnetic drive mechanism; 311—cylindrical bobbin; 312—coil element; 313—moving magnet; 4—telescope mechanism; 41—telescope assembly; 411—first positioning tube; 4111—first chute; 4112—first corner; 4113—second corner; 412—second positioning tube; 4121—guide groove; 4122—annular limiting groove; 4123—annular fastener; 413—first limiting portion; 414—second limiting portion; 415—guide groove ring; 42—movable portion; 43—motor; 44—lead screw; 45—slidable support; 451—second chute; 46—spring; 47—lock catch; 48—synchronous wheel; 49—synchronous belt; 5—connection rod; 6—battery; 7—circuit control unit; 71—PCBA; 72—PCBA cover; 73—silicone bottom; 74—silicone positioning ring; 8—button; 9—charging nail; 10—waterproof ring; 17—magnet limiting ring; 18—magnet ring; and 19—connection rod fixing ring.

DETAILED DESCRIPTION

Unless otherwise defined, all the technical and scientific terms used in this specification are the same as those usually understood by persons skilled in the art of the present disclosure. Additionally, the terms used in the specification of the present disclosure are merely for description the embodiments of the present disclosure, but are not intended to limit the present disclosure. The terms "comprise," "include," and variations thereof in the specification, claims and accompanying drawings are intended to define a non-exclusive meaning. The terms such as "first," "second," and the like in the specifications, claims or the accompanying drawings of the present disclosure are intended to distinguishing different objects but are not intended to define a specific sequence.

The term "embodiments" in this specification signifies that the specific feature, structure or feature described with reference to the embodiments may be covered in at least one embodiment of the present disclosure. This term, when appearing in various positions of the specification, neither indicates the same embodiment, nor indicates an independent or optional embodiment that is exclusive of the other embodiments. A person skilled in the art would implicitly or explicitly understand that the embodiments described in this specification may be incorporated with other embodiments.

For better understanding of the technical solutions of the present disclosure by a person skilled in the art, the technical solutions according to the embodiments of the present disclosure are clearly and completely described with reference to the accompanying drawings.

First Embodiment

Figure 2:
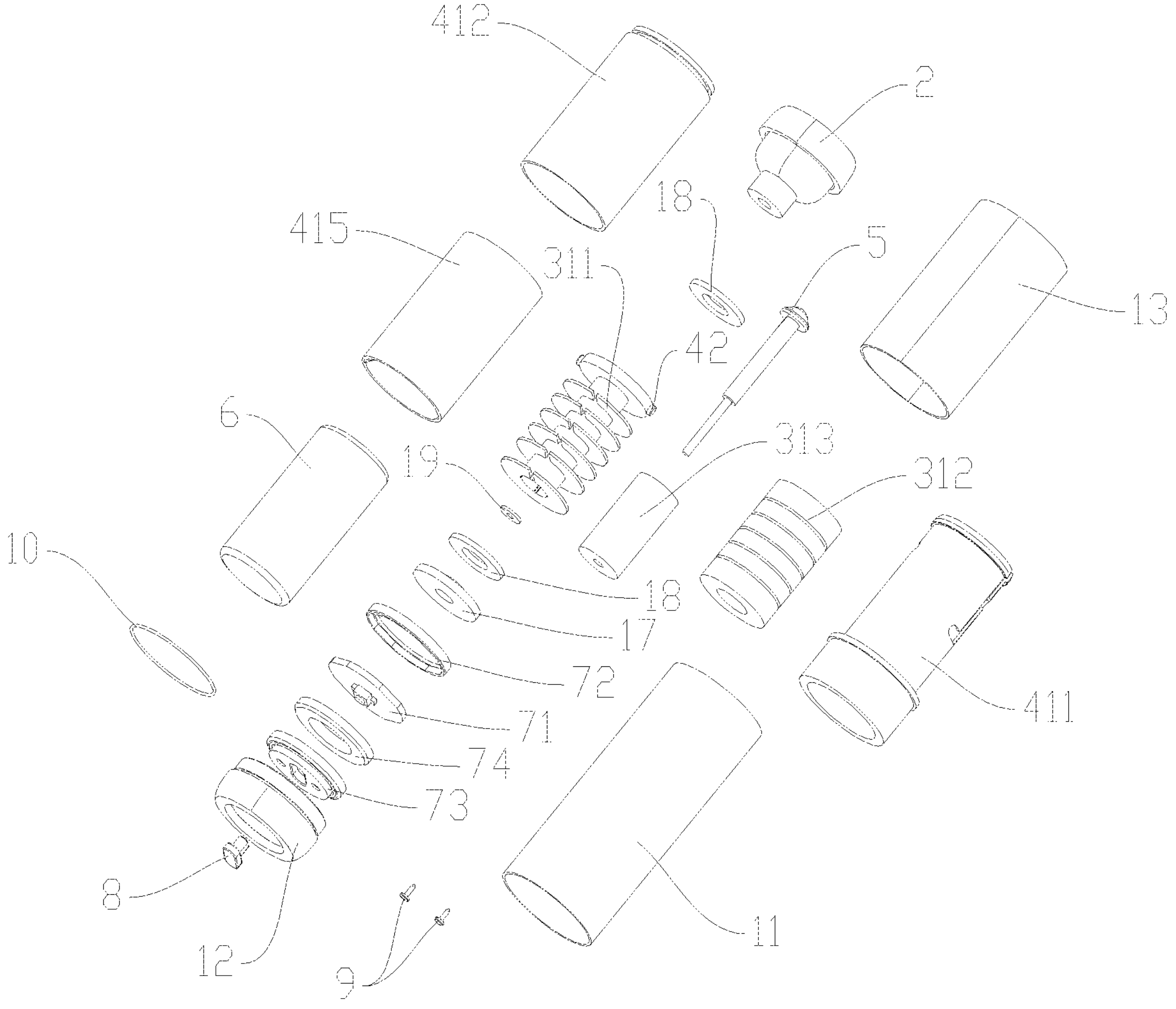
FIG. 2 is an exploded view of the multifunctional massage device according to the first embodiment of the present disclosure.

As illustrated in FIG. 1 and FIG. 2, a multifunctional massage device includes:

a housing 1;

a massage portion 2, capable of being protruded from the housing 1 or being recessed to the housing 1;

a drive mechanism 3, disposed in the housing 1, wherein an output end of the drive mechanism 3 is connected to the massage portion 2, and the drive mechanism 3 is configured to drive the massage portion 2 to reciprocate; and a telescope mechanism 4, disposed in the housing 1 and connected to the drive mechanism 3, wherein the telescope mechanism 4 is configured to drive the drive mechanism 3 to telescope in the housing 1, and drive, by the drive mechanism 3, the massage portion 2 to transition between being protruded from the housing 1 and being recessed to the housing 1.

In the multifunctional massage device according to this embodiment, the massage portion 2 is capable of being protruded from the housing 1 or being recessed to the housing 1. During use, the telescope mechanism 4 drives the drive mechanism 3 to telescope in the housing 1 to drive the massage portion 2 connected to the drive mechanism 3 to telescope in the housing 1, such that the massage portion 2 transitions between being protruded from the housing 1 and being recessed to the housing 1, and the massage portion 2 is driven by the drive mechanism 3 to reciprocate. In this way, the massage portion 2 achieves two massage modes by transitioning between being protruded from the housing 1 and being recessed to the housing 1. In the case that the massage portion 2 is protruded from the housing 1, the massage portion 2 is made to be in contact with a part to be massaged, the drive mechanism 3 drives the massage portion 2 to reciprocate, and the massage portion 2 is capable of carrying out tapping massage on the part to be massaged. In the case that the massage portion 2 is recessed to the housing 1, a massaging recess is defined at one end, located on the massage portion 2, of the housing 1, the massaging recess is covered on the part to be massaged, and the drive mechanism 3 drives the massage portion 2 to reciprocate, such that the massaging recess produces a suction force to carry out suction massage on the part to be massaged in the massaging recess. Therefore, the multifunctional massage device is capable of carrying out both tapping massage and suction massage, and relieving fatigue, stretching the skin or muscle, and achieving a health-care effect. By transition between tapping massage and suction massage, the multifunctional massage device is capable of accurately massaging different parts of a human body, and improving comfort of massage and greatly enhancing the massage effect. In addition, the multifunctional massage device may quickly transition between tapping massage and suction massage, such that use convenience of the multifunctional massage is greatly improved.

In this embodiment, the telescope mechanism 4 includes a telescope assembly 41 and a movable portion 42. The movable portion 42 is slidably disposed on the telescope assembly 41 and is fixedly connected to the drive mechanism 3.

As illustrated in FIG. 2, and FIG. 5 to FIG. 8, the telescope assembly 41 is provided with a first limiting portion 413 and a second limiting portion 414. The telescope assembly 41 is configured to drive the movable portion 42 to slide, and control the drive mechanism 3 to move between the first limiting portion 413 and the second limiting portion 414.

In this embodiment, the position of the drive mechanism 3 may be manually adjusted by the telescope assembly 41. Specifically, when moving, the telescope assembly 41 drives the movable portion 42 to slide on the telescope assembly 41, such that the drive mechanism 3 fixedly connected to the movable portion 42 telescopes in the housing 1. A stroke of the drive mechanism 3 is limited between the first limiting portion 413 and the second limiting portion 414, such that the drive mechanism 3 drives the massage portion 2 to transition between being protruded from the housing 1 and being recessed to the housing 1.

The telescope assembly 41 includes a first positioning tube 411 and a second positioning tube 412. An outer diameter of the first positioning tube 411 is less than an inner diameter of the second positioning tube 412. The first positioning tube 411 is mounted in the second positioning tube 412. The second positioning tube 412 is clockwise or counterclockwise rotatable relative to the first positioning tube 411. The first limiting portion 413 is disposed at one end of the first positioning tube 411. The second limiting portion 414 is disposed at the other end of the first positioning tube 411. Two ends of the second positioning tube 412 are respectively connected to the first limiting portion 413 and the second limiting portion 414.

A first chute 4111 is arranged in the first positioning tube 411. The first chute 4111 is disposed between the first limiting portion 413 and the second limiting portion 414. A guide groove 4121 or a guide groove ring having a guide groove 4121 is arranged in the second positioning tube 412. The movable portion 42 is inserted into the first chute 4111 and is slidably mounted in the guide groove 4121. In this embodiment, the movable portion 42 is in a circular-shaft shape.

The first chute 4111 is axially disposed along the first positioning tube 411 and has a specific length. The length of the first chute 4111 is less than or equal to a spacing between the first limiting portion 413 and the second limiting portion 414. Therefore, in the case that the second positioning tube 412 is clockwise or counterclockwise rotated relative to the first positioning tube 411, the movable portion 42 is driven to slide in both the first chute 4111 and the guide groove 4121, and is limited to sliding between the first limiting portion 413 and the second limiting portion 414. In this way, the stroke of the drive mechanism 3 is limited between the first limiting portion 413 and the second limiting portion 414.

A first corner 4112 that is circumferentially disposed along the first positioning tube 411 is defined at an end, close to the first limiting portion 413, of the first chute 4111, and a second corner 4113 that is circumferentially disposed along the first positioning tube 411 is defined at an end, close to the second limiting portion 414, of the first chute 4111. One of the first corner 4112 and the second corner 4113 is clockwise circumferentially disposed along the first positioning tube 411, and the other of the first corner 4112 and the second corner 4113 is counterclockwise circumferentially disposed along the first positioning tube 411. For example, the first corner 4112 is clockwise circumferentially disposed along the first positioning tube 411, and the second corner 4113 is counterclockwise circumferentially disposed along the first positioning tube 411, such that in the case that the second positioning tube 412 is clockwise or counterclockwise rotated relative to the first positioning tube 411, the movable portion 42 is capable of sliding in the first chute 4111 and sliding to the first corner 4112 or the second corner 4113.

Figure 9:
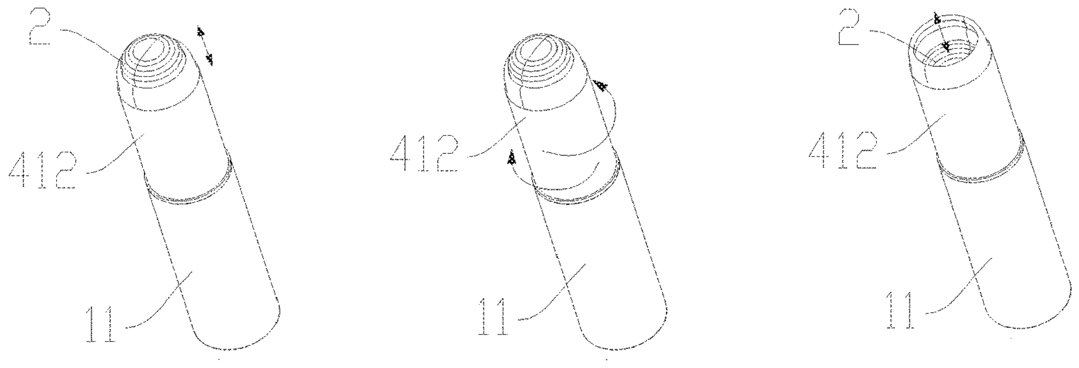
FIG. 9 is a schematic state transition view of a massage portion regulated by a telescope mechanism according to the first embodiment of the present disclosure.

Referring to FIG. 9, the drive mechanism 3 is disposed in the first positioning tube 411. The second positioning tube 412 is capable of counterclockwise or clockwise rotating relative to the first positioning tube 411 and driving the movable portion 42 to slide in both the first chute 4111 and the guide groove 4121 to drive the drive mechanism 3 to move in the first positioning tube 411. In the case that the movable portion 42 enters the first corner 4112, the second positioning tube 412 is capable of stopping rotating relative to the first positioning tube 411, and the drive mechanism 3 is fixed at a corresponding position of the first limiting portion 413 on the first positioning tube 411. It may be understood that the first positioning tube 411 is also capable of counterclockwise or clockwise rotating relative to the second positioning tube 412. In this embodiment, description is given using the scenario where the second positioning tube 412 is rotated relative to the first positioning tube 411. For example, in the case that the second positioning tube 412 is counterclockwise rotated relative to the first positioning tube 411, the guide groove 4121 of the second positioning tube 412 drives the movable portion 42 to slide on the first chute 4111 towards the first corner 4112, to drive the drive mechanism 3 fixedly connected to the movable portion 42 to move in the first positioning tube 411. In the case that the movable portion 42 enters the first corner 4112, the movable portion 42 is limited at the first corner 4112, the second positioning tube 412 is capable of stopping rotating relative to the first positioning tube 411, that is, the second positioning tube 412 is incapable of counterclockwise rotating relative to the first positioning tube 411, and the second positioning tube 412 is only capable of clockwise rotating relative to the first positioning tube 411. In this case, since the movable portion 42 is limited at the first corner 4112, the drive mechanism 3 is fixed at the corresponding position of the first limiting portion 413 on the first positioning tube 411, that is, the position of the movable portion 42 is limited via the first corner 4112, such that the position of the drive mechanism 3 in the first positioning tube 411 is limited.

The second positioning tube 412 is capable of clockwise or counterclockwise rotating relative to the first positioning tube 411 and driving the movable portion 42 to slide in both the first chute 4111 and the guide groove 4121 to drive the drive mechanism 3 to move in the first positioning tube 411. In the case that the movable portion 42 enters the second corner 4113, the second positioning tube 412 is capable of stopping rotating relative to the first positioning tube 411, and the drive mechanism 3 is fixed at a corresponding position of the second limiting portion 414 on the first positioning tube 411. For example, in the case that the second positioning tube 412 is clockwise rotated relative to the first positioning tube 411, the guide groove 4121 of the second positioning tube 412 drives the movable portion 42 to slide on the first chute 4111 towards the second corner 4113, to drive the drive mechanism 3 fixedly connected to the movable portion 42 to move in the first positioning tube 411. In the case that the movable portion 42 enters the second corner 4113, the movable portion 42 is limited at the second corner 4113, the second positioning tube 412 is capable of stopping rotating relative to the first positioning tube 411, that is, the second positioning tube 412 is incapable of clockwise rotating relative to the first positioning tube 411, and the second positioning tube 412 is only capable of counterclockwise rotating relative to the first positioning tube 411. In this case, since the movable portion 42 is limited at the second corner 4113, the drive mechanism 3 is fixed at the corresponding position of the second limiting portion 414 on the first positioning tube 411, that is, the position of the movable portion 42 is limited via the second corner 4113, such that the position of the drive mechanism 3 in the first positioning tube 411 is limited.

Figure 10:
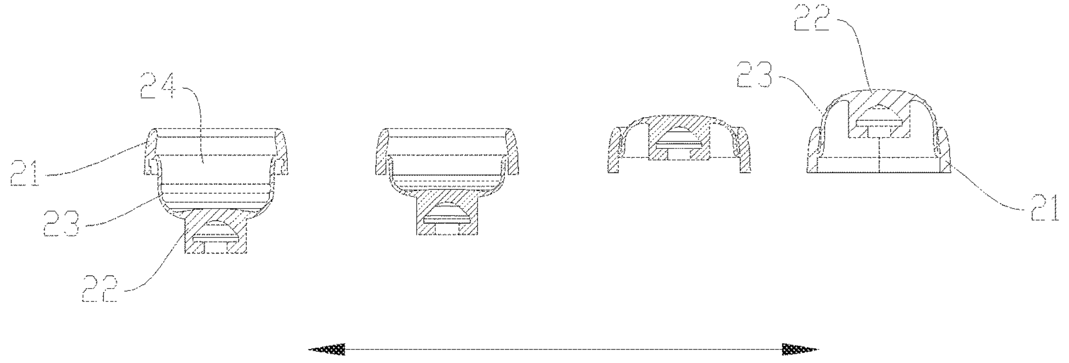
FIG. 10 is a schematic state transition view of the massage portion according to the first embodiment of the present disclosure.

Referring to FIG. 10, in the case that the drive mechanism 3 is fixed at the corresponding position of the first limiting portion 413 on the first positioning tube 411, the massage portion 2 is protruded from the housing 1. Since the massage portion 2 is connected to the drive mechanism 3, in the case that the second positioning tube 412 is counterclockwise rotated relative to the first positioning tube 411, the guide groove 4121 of the second positioning tube 412 drives the movable portion 42 to slide on the first chute 4111 towards the first corner 4112, such that the massage portion 2 connected to the drive mechanism 3 is driven to move along a direction of being protruded from the housing 1. In the case that the movable portion 42 enters the first corner 4112, the drive mechanism 3 is fixed at the corresponding position of the first limiting portion 413 on the first positioning tube 411, such that the massage portion 2 is protruded from the housing 1.

In the case that the drive mechanism 3 is fixed at the corresponding position of the second limiting portion 414 on the first positioning tube 411, the massage portion 2 is recessed to the housing 1. Since the massage portion 2 is connected to the drive mechanism 3, in the case that the second positioning tube 412 is clockwise rotated relative to the first positioning tube 411, the guide groove 4121 of the second positioning tube 412 drives the movable portion 42 to slide on the first chute 4111 towards the second corner 4113, such that the massage portion 2 connected to the drive mechanism 3 is driven to move along a direction of being recessed to the housing 1. In the case that the movable portion 42 enters the second corner 4113, the drive mechanism 3 is fixed at the corresponding position of the second limiting portion 414 on the first positioning tube 411, such that the massage portion 2 is recessed to the housing 1. Therefore, by relative rotations between the second positioning tube 412 and the first positioning tube 411, the massage portion 2 quickly transitions between being protruded from the housing 1 and being recessed to the housing 1. In this way, the massage device quickly transitions between tapping massage and suction massage, and use convenience of the massage device is greatly improved.

In this embodiment, the number of the first chutes 4111 is two. An opening extending to the first limiting portion 413 is arranged in at least one of the two first chutes 4111, such that the movable portion 42 is conveniently mounted in the first chute 4111 via the opening. The number of the movable portions 42 is two. The two movable portions 42 are symmetrically arranged. The number of the guide grooves 4121 is two. The two guide grooves 4121 are symmetrically arranged. The guide groove 4121 is a spiral guide groove which spirally extends from one end of the second positioning tube 412 to the other end of the second positioning tube 412. In the case that the second positioning tube 412 is rotated relative to the first positioning tube 411, the movable portion 42 slides, under driving by the spiral guide groove, in the first guide groove 4121.

In this embodiment, the first positioning tube 411 is made of an elastic material, a diameter of the movable portion 42 is less than a width of the first chute 4111, a length of the movable portion 42 is greater than a thickness of a wall thickness of the first positioning tube 411, and the length of the movable portion 42 is less than or equal to a sum of a wall thickness of the first positioning tube 411 and a depth of the guide groove 4121. Preferably, the length of the movable portion 42 is equal to the sum of the wall thickness of the first positioning tube 411 and the depth of the guide groove 4121.

The first limiting portion 413 and the second limiting portion 414 are disposed on an outer periphery of the first positioning tube 411, and are radially protruded from the first positioning tube 411. An annular limiting groove 4122 engageable with the first limiting portion 413 of the first positioning tube 411 is disposed on an inner wall at one end of the second positioning tube 412. In the case that the first positioning tube 411 is mounted in the second positioning tube 412, the first limiting portion 413 is nested into the annular limiting groove 4122, and the second limiting portion 414 is abutted against one end, facing away from the annular limiting groove 4122, of the second positioning tube 412. A length of the second positioning tube 412 is less than a length of the first positioning tube 411. In the case that the first positioning tube 411 is mounted in the second positioning tube 412, the second limiting portion 414 of the first positioning tube 411 is exposed from the second positioning tube 412.

Figure 11:
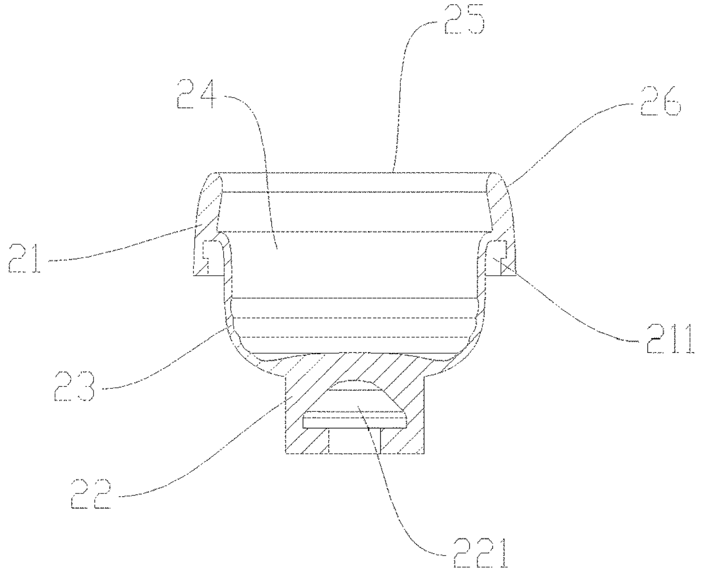
FIG. 11 is a schematic structural view of the massage portion that is recessed to a housing according to the first embodiment of the present disclosure.
Figure 12:
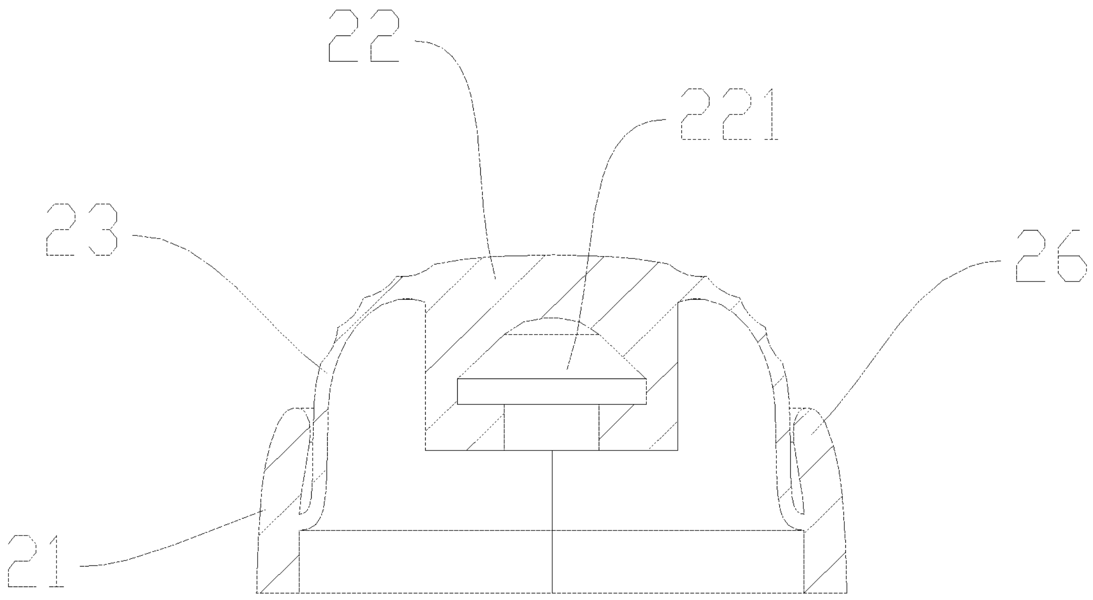
FIG. 12 is a schematic structural view of the massage portion that is protruded from the housing according to the first embodiment of the present disclosure.

As illustrated in FIG. 2, FIG. 11, and FIG. 12, the massage portion 2 includes a fixed circumferential wall 21, a movable wall 22, and a connection circumferential wall 23. The connection circumferential wall 23 is disposed between the fixed circumferential wall 21 and the movable wall 22, and the fixed circumferential wall 21 is connected to the telescope mechanism 4.

The multifunctional massage device further includes a connection rod 5. One end of the connection rod 5 is connected to the movable wall 22, and the other end of the connection rod 5 is connected to the drive mechanism 3. The drive mechanism 3 is configured to control, by the connection rod 5, the movable wall 22 to reciprocate.

A connection hole 221 is arranged in the movable wall 22. The connection hole 221 is configured to allow the connection rod 5 to be inserted therein. An insertion end of the connection rod 5 is engageable with the connection hole 221.

In the case that the massage portion 2 is recessed to the housing 1, at least one first chamber 24 is defined in the massage portion 2, the fixed circumferential wall 21 defines an opening 25 of the first chamber 24, the movable wall 22 defines a bottom of the first chamber 24, the connection circumferential wall 23 defines a chamber wall of the first chamber 24 between the fixed circumferential wall 21 and the movable wall 22. The opening 25 of the first chamber 24 is greater than the bottom of the first chamber 24. In the case that the massage portion 2 is recessed to the housing 1, a massaging recess is defined at one end, located at the massage portion 2, of the housing 1. The massaging recess is covered on the part to be massaged, the drive mechanism 3 drives, via the connection rod 5, the movable wall 22 to reciprocate to change the volume of the first chamber 24, such that a suction force is produced in the first chamber 24 to carry out suction massage on the part to be massaged in the massaging recess.

In the case that the massage portion 2 is protruded from the housing 1, the connection rod 5 is inserted into the connection hole 221 of the movable wall 22. Under pushing by the connection rod 5, the connection wall drives the movable wall 22 to be protruded from the housing 1, and the massage portion 2 is in contact with the part to be massaged. In this case, the drive mechanism 3 controls, via the connection rod 5, the movable wall 22 to reciprocate, and the movable wall 22 is capable of carrying out tapping massage on the part to be massaged.

Figure 3:
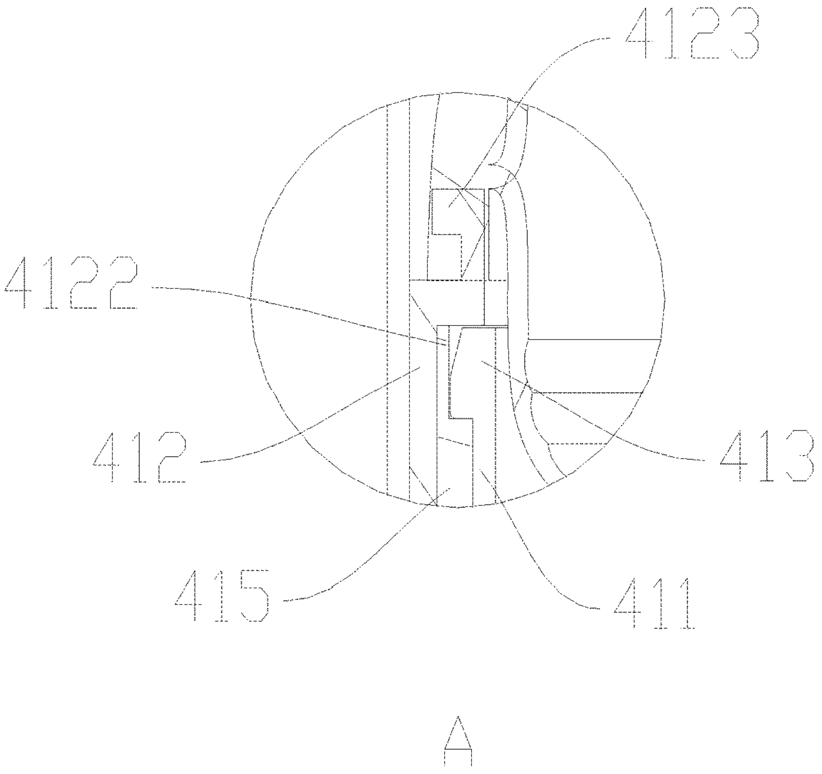
FIG. 3 is an enlarged view of part A in FIG. 1.

Referring to FIG. 3, the fixed circumferential wall 21 is cladding connected to one end of the second positioning tube 412, and radial snaps are disposed on an outer periphery at one end, connected to the fixed circumferential wall 21, of the second positioning tube 412. The radial snaps are connected to define an annular snap 4123. Snaps facing oppositely from the opening 25 are disposed on an outer periphery of the opening 25, where the fixed circumferential wall 21 is disposed, of the first chamber 24. The snaps are connected to define an annular snap fastener 211. The annular snap fastener 211 has an inwardly radial chamfer, and the annular snap 4123 is tightly inlaid into the radial chamfer of the annular snap fastener 211.

An extension portion is disposed on the fixed circumferential wall 21 in a direction facing towards the opening 25 of the first chamber 24, and an extended circumferential wall 26 is defined.

During use of the multifunctional massage device according to the embodiment of the present disclosure, the massage portion 2 is made to be in contact with the part to be massaged, and the drive mechanism 3 controls, via the connection rod 5, the movable wall 22 to reciprocate. In this way, tapping massage or suction massage is carried out on the part to be massaged. In the case that the massage portion 2 is protruded from the housing 1, the drive mechanism 3 controls, via the connection rod 5, the movable wall 22 to reciprocate, and the movable wall 22 is capable of carrying out tapping massage on the part to be massaged. In the case that the massage portion 2 is recessed to the housing 1, the drive mechanism 3 drives, via the connection rod 5, the movable wall 22 to reciprocate to change the volume of the first chamber 24, such that suction force is produced in the first chamber 24 to carry out suction massage on the part to be massaged. Accurate massage may be carried out on a small region of the human body, or massage may be carried out on some protruded parts of the human body. By transition between tapping massage and suction massage, comfort of massage may be improved, the massage effect may be greatly improved, blood circulation of the part to be massaged may be promoted, stimulation and joy of massage may be increased, and the effect of relieving the whole body may be achieved.

Figure 4:
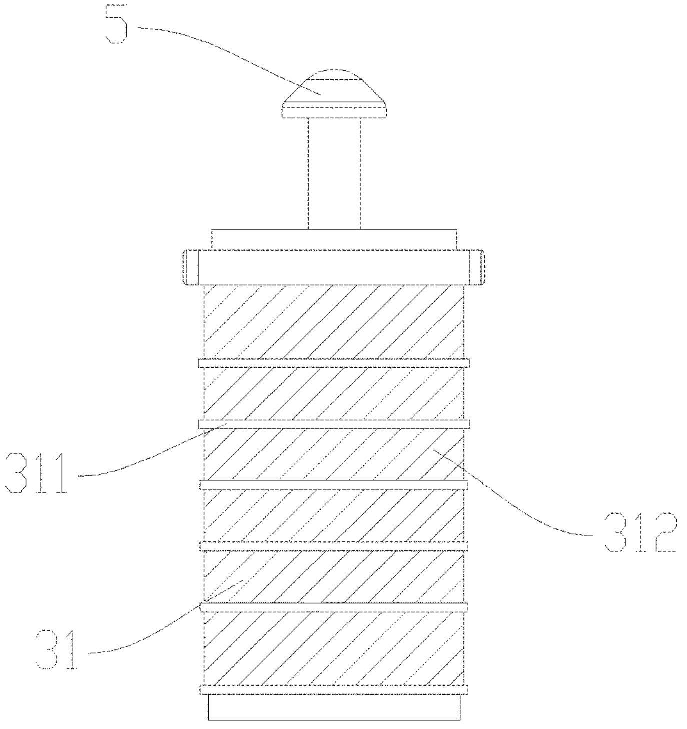
FIG. 4 is a schematic view of connections between an electromagnetic drive mechanism and a connection rod according to the first embodiment of the present disclosure.
Figure 5:
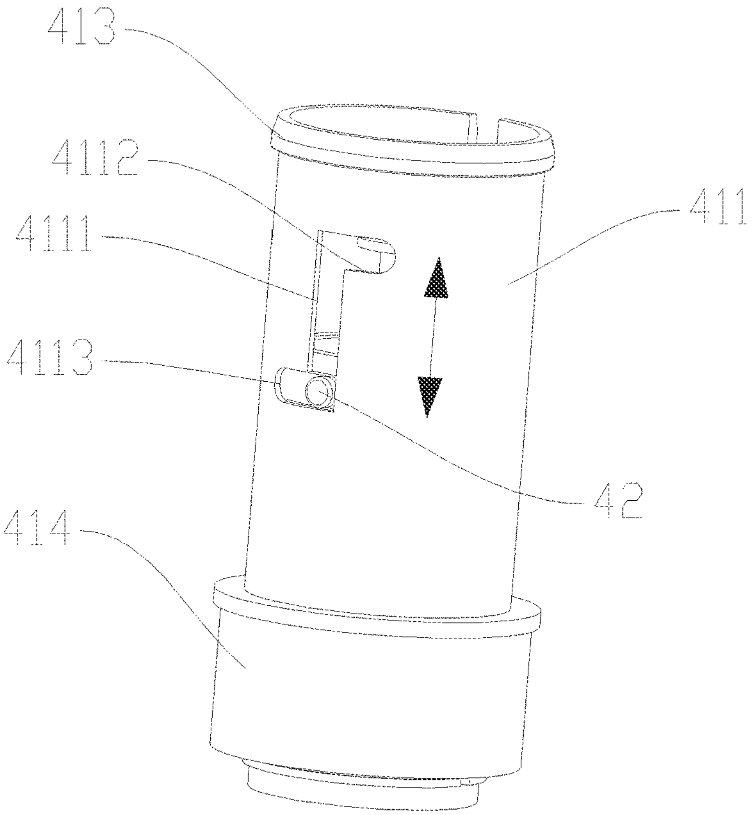
FIG. 5 is a schematic structural view of a first positioning tube according to the first embodiment of the present disclosure.
Figure 6:
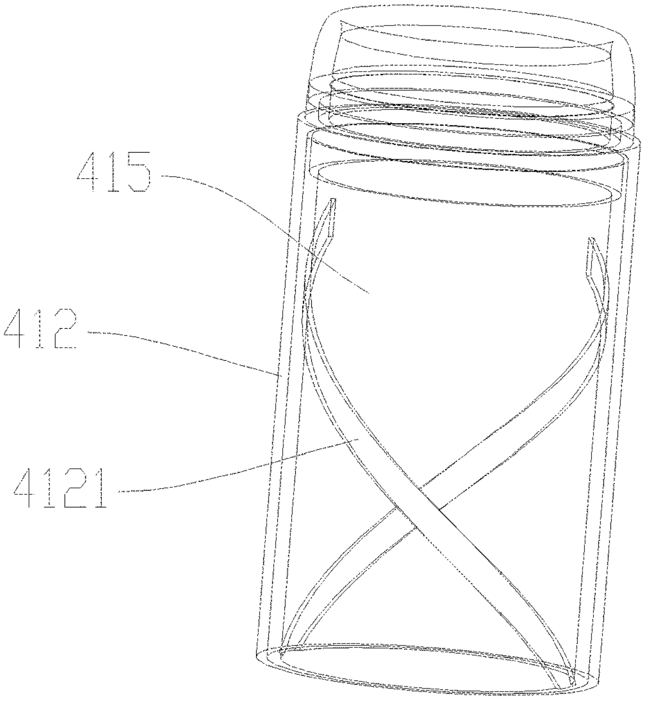
FIG. 6 is a schematic structural view of a second positioning tube according to the first embodiment of the present disclosure.
Figure 7:
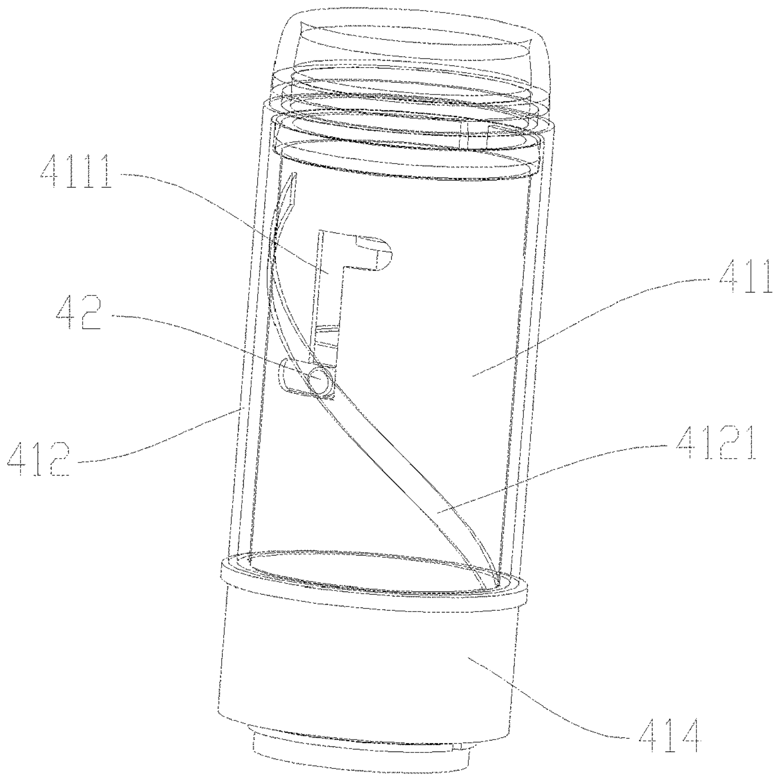
FIG. 7 is a schematic view of connections of the first positioning tube, the second positioning tube, and a movable portion according to the first embodiment of the present disclosure.
Figure 8:
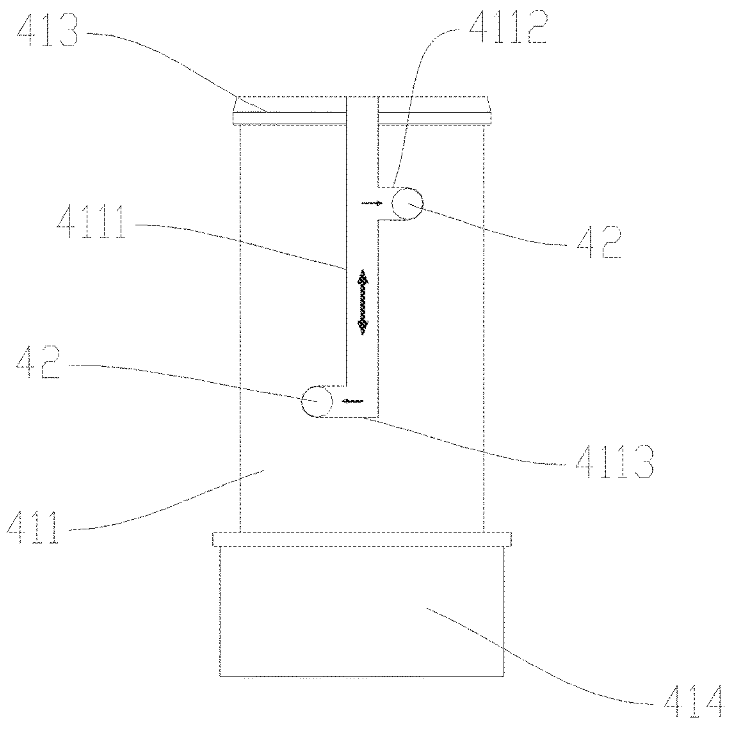
FIG. 8 is a schematic view of sliding of the movable portion in a first chute according to the first embodiment of the present disclosure.

As illustrated in FIG. 1, FIG. 2, and FIG. 4, in this embodiment, the drive mechanism 3 is an electromagnetic drive mechanism 31. The electromagnetic drive mechanism 31 includes a cylindrical bobbin 311, a coil element 312 disposed on an outer periphery of the cylindrical bobbin 311, and a moving magnet 313 mounted in the cylindrical bobbin 311 and reciprocating therein. The electromagnetic drive mechanism 31 further includes a magnet limiting ring 17 and a magnet ring 18. The magnet limiting ring 17 is disposed at a bottom of the cylindrical bobbin 311. The number of the magnet rings 18 is two, and the two magnet rings 18 are respectively mounted at a top of the cylindrical bobbin 311 and the magnet limiting ring 17 at the bottom of the cylindrical bobbin 311.

One end of the connection rod 5 is directly or indirectly connected to the moving magnet 313. Preferably, the connection rod 5 is indirectly connected to the moving magnet 313 via a connection rod fixing ring 19, or the connection rod 5 is directly fixedly connected to the moving magnet 313. The moving magnet 313 drives the connection rod 5 to reciprocate to control the movable wall 22 to reciprocate. The movable portion 42 is formed by an end body extending from one end of the cylindrical bobbin 311 or is a structure mounted at one end of the cylindrical bobbin 311.

The housing 1 is in a lipstick tube shape, such that the multifunctional massage device has good portability. The housing 1 includes a gripping portion 11, a tail cover 12, and a top cover 13. The tail cover 12 and the top cover 13 are respectively disposed at two ends of the gripping portion 11. The top cover 13 at least covers the massage portion 2. An accommodation chamber is arranged in the gripping portion 11. The accommodation chamber is provided with a battery 6 and a circuit control unit 7. The battery 6 is electrically connected to the circuit control unit 7. The circuit control unit 7 is electrically connected to the drive mechanism 3. The telescope mechanism 4 is connected to one end, facing away from the tail cover 12, of the gripping portion 11. The massage portion 2, the telescope mechanism 4, and the gripping portion 11 are disposed in a same axis.

The multifunctional massage device further includes a button 8, charging nails 9, and a waterproof ring 10. The button 8 and the charging nails 9 are disposed on the tail cover 12. The button 8 is configured to turn on or turn off the multifunctional massage device. The charging nails 9 are configured to charge the multifunctional massage device. The waterproof ring 10 is disposed between the tail cover 12 and the gripping portion 11 to seal a gap between the tail cover 12 and the gripping portion 11.

The circuit control unit 7 includes a PCBA 71, a PCBA cover 72, a silicone base 73, and a silicone positioning ring 74. The PCBA 71 is disposed in the PCBA cover 72. One face of the silicone base 73 is connected to the tail cover 12, and the other face of the silicone base is connected to the silicone positioning ring 74. The silicone positioning ring 74 is connected to the PCBA 71.

In the multifunctional massage device according to the embodiment of the present disclosure, the massage portion 2 is capable of being protruded from the housing 1 or being recessed to the housing 1. During use, the second positioning tube 412 is counterclockwise rotated relative to the first positioning tube 411, and the guide groove 4121 of the second positioning tube 412 drives the movable portion 42 to slide on the first chute 4111 towards the first corner 4112, such that the drive mechanism 3 fixedly connected to the movable portion 42 is driven to slide in the first positioning tube 411. In the case that the movable portion 42 enters the first corner 4112, the movable portion 42 is limited at the first corner 4112, and the second positioning tube 412 stops rotating relative to the first positioning tube 411. Since the movable portion 42 is limited at the first corner 4112, the drive mechanism 3 is fixed at the corresponding position of the first limiting portion 413 on the first positioning tube 411. In this case, the massage portion 2 is protruded from the housing 1. The electromagnetic drive mechanism 31 controls, via the connection rod 5, the movable wall 22 to reciprocate, such that the movable wall 22 carries out tapping massage on the part to be massaged.

The second positioning tube 412 is clockwise rotated relative to the first positioning tube 411, and the guide groove 4121 of the second positioning tube 412 drives the movable portion 42 to slide on the first chute 4111 towards the second corner 4113, such that the drive mechanism 3 fixedly connected to the movable portion 42 is driven to slide in the first positioning tube 411. In the case that the movable portion 42 enters the second corner 4113, the movable portion 42 is limited at the second corner 4113, and the second positioning tube 412 stops rotating relative to the first positioning tube 411. Since the movable portion 42 is limited at the second corner 4113, the drive mechanism 3 is fixed at the corresponding position of the second limiting portion 414 on the first positioning tube 411. In this case, the massage portion 2 is protruded from the housing 1. The electromagnetic drive mechanism 31 controls, via the connection rod 5, the movable wall 22 to reciprocate to change the volume of the first chamber 24, such that a suction force is produced in the first chamber 24 to carry out suction massage on the part to be massaged in the massaging recess.

Therefore, by carrying out tapping massage or suction massage on the part to be massaged, fatigue is relieved, the skin or muscle is stretched, and a health-care effect is achieved. In addition, by relative rotations between the second positioning tube 412 and the first positioning tube 411, the massage portion 2 quickly transitions between being protruded from the housing 1 and being recessed to the housing 1. In this way, the massage device quickly transitions between tapping massage and suction massage, and use convenience of the massage device is greatly improved. By transition between tapping massage and suction massage, comfort of massage may be improved, the massage effect may be greatly improved, blood circulation of the part to be massaged may be promoted, stimulation and joy of massage may be increased, and the effect of relieving the whole body may be achieved.

Second Embodiment

Figure 13:
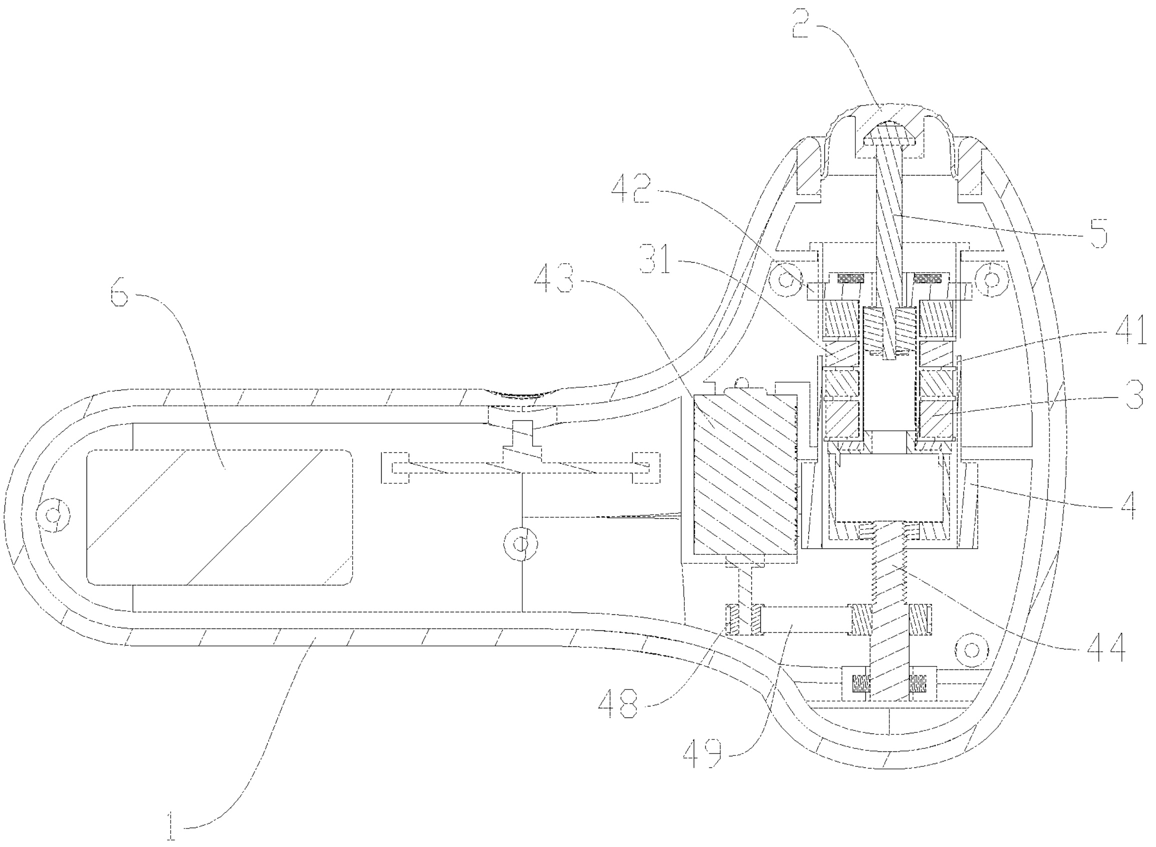
FIG. 13 is a schematic structural view of a multifunctional massage device according to a second embodiment of the present disclosure.
Figure 14:
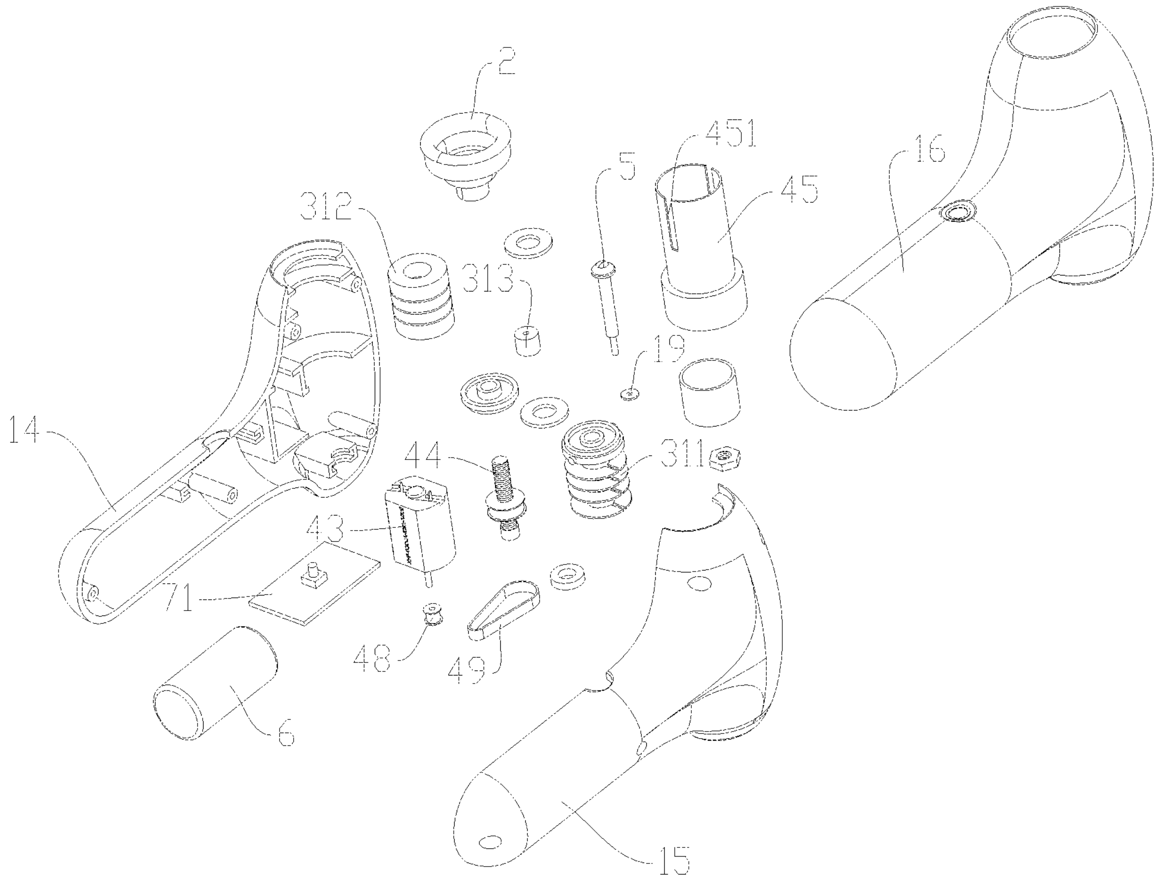
FIG. 14 is an exploded view of the multifunctional massage device according to the second embodiment of the present disclosure.

As illustrated in FIG. 13 and FIG. 14, a multifunctional massage device is provided. Different from the first embodiment, the housing 1 has a T-shaped cross section in this embodiment. The housing 1 includes an upper housing 14, a lower housing 15, and a silicone sleeve 16. The silicone sleeve 16 is sleeved on the upper housing 14 and the lower housing 15 to mount the upper housing 14 and the lower housing 15. An accommodation chamber is defined by mounting the upper housing 14 and the lower housing 15. The drive mechanism 3, the telescope mechanism 4, the battery 6, and the like are mounted in the accommodation chamber. The battery 6 is electrically connected to the circuit control unit 7. The circuit control unit 7 is electrically connected to the drive mechanism 3.

The telescope mechanism 4 includes a motor 43 and a lead screw 44. The motor 43 is connected to the lead screw 44. The drive mechanism 3 is connected to a nut seat on the lead screw 44. The motor 43 is connected to the circuit control unit 7.

The telescope mechanism 4 further includes a synchronous wheel 48 and a synchronous belt 49 sleeved on the synchronous wheel 48. The motor 43 drives the synchronous wheel 48 to rotate to drive the synchronous belt 49 to rotate, such that the lead screw 44 is driven to move.

The telescope mechanism 4 further includes a slidable support 45 and a movable portion 42. The slidable support 45 is disposed in the housing 1. A second chute 451 is arranged in the slidable support 45. The movable portion 42 is slidably disposed in the second chute 451 and is fixedly connected to the drive mechanism 3. The motor 43 drives the lead screw 44 to move, the nut seat on the lead screw 44 drives the drive mechanism 3 to move, and the drive mechanism 3 slides on the second chute 451 via the movable portion 42. In this way, the drive mechanism 3 telescopes in the housing 1, such that the drive mechanism 3 drives the massage portion 2 transitions between being protruded from the housing 1 and being recessed to the housing 1.

Third Embodiment

Figure 15:
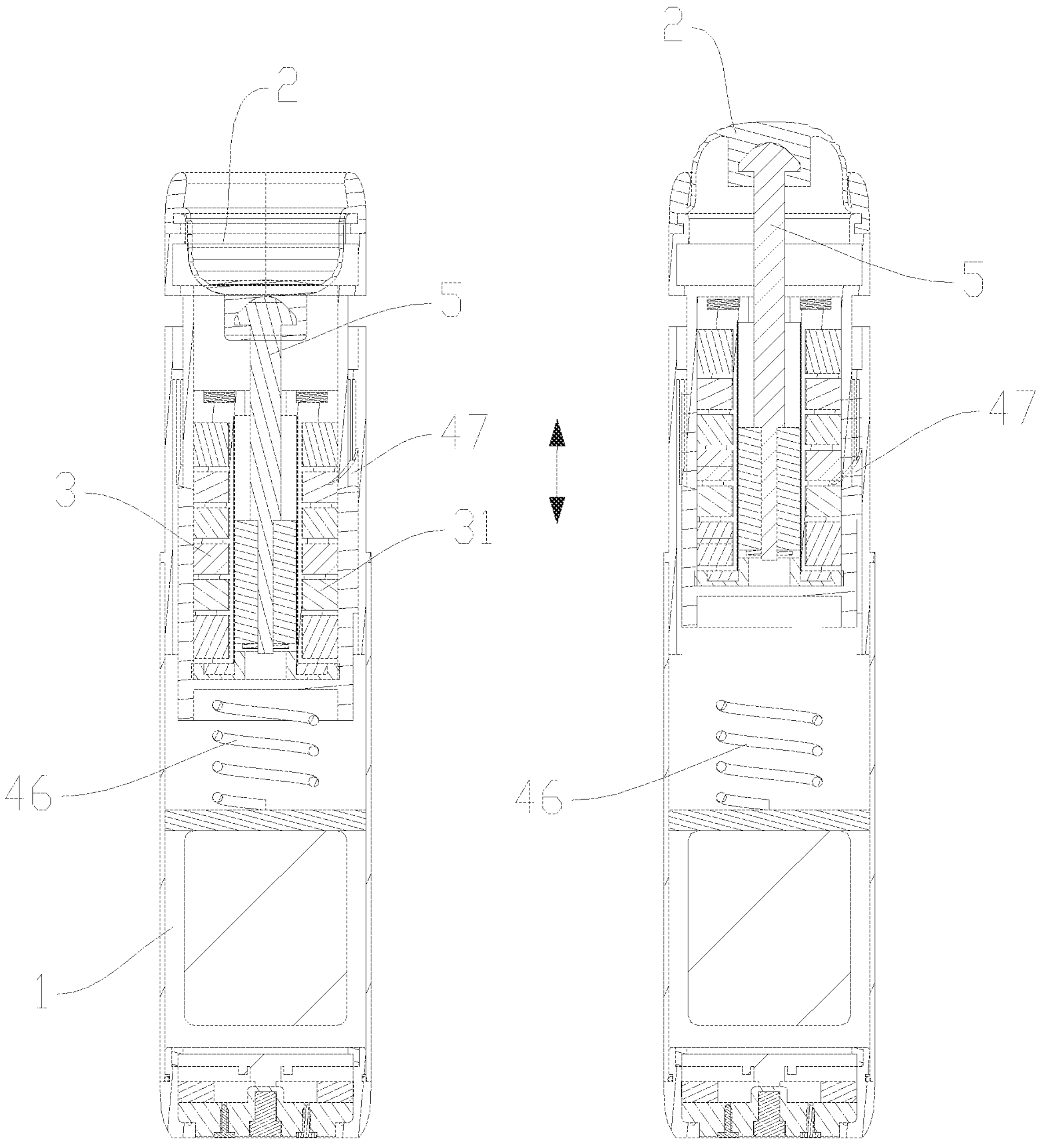
FIG. 15 is a schematic structural view of a multifunctional massage device according to a third embodiment of the present disclosure.
Figure 16:
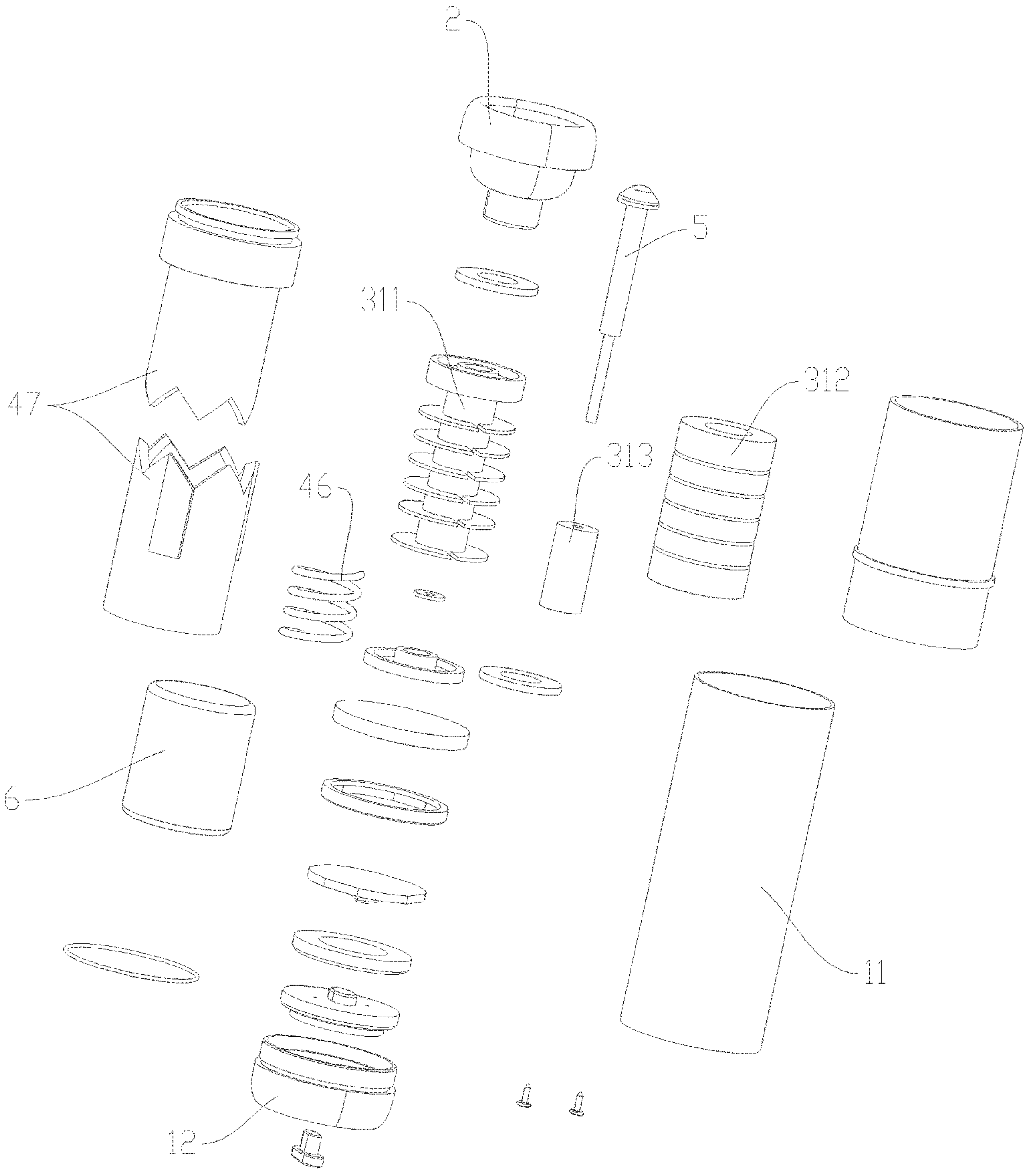
FIG. 16 is an exploded view of the multifunctional massage device according to the third embodiment of the present disclosure.

As illustrated in FIG. 15 and FIG. 16, a multifunctional massage device is provided. Different from the first embodiment, the telescope mechanism is a ball-pen manual press mechanism. The manual press mechanism includes a spring 46 and a lock catch 47. The lock catch 47 is connected to the drive mechanism 3. The spring 46 is connected to the lock catch 47. In the case that the massage portion 2 is protruded from the housing 1, by pressing the massage portion 2, the lock catch 47 drives the drive mechanism 3 to move downwards and hence compresses the spring 46, such that the massage portion 2 transitions to a state of being recessed to the housing 1. By pressing the massage portion 2 again, the lock catch 47 drives the drive mechanism 3 to move upwards under an elastic force of the spring 46, such that the massage portion 2 transitions to a state of being protruded from the housing 1. In this way, transition between being protruded from the housing 1 and being recessed to the housing 1 is achieved for the massage portion 2.

Fourth Embodiment

A multifunctional massage device is provided. Different from the first embodiment, the drive mechanism 3 is a rotary motor drive mechanism and includes a power output assembly or a power converter assembly. The movable portion 42 is formed by an end body extending from one end of the rotary motor drive mechanism or is a structure mounted at one end of the rotary motor drive mechanism, one end of the connection rod 5 is connected to the power output assembly or the power converter assembly of the rotary motor drive mechanism, and the power output assembly or the power converter assembly drives the connection rod 5 to reciprocate to control the movable wall 22 to reciprocate. Specifically, the rotary motor drive mechanism includes a rotary motor, and the power output assembly or the power converter assembly is a lead screw or a synchronous assembly.

Fifth Embodiment

A multifunctional massage device is provided. Different from the first embodiment, the drive mechanism 3 is a linear motor drive mechanism and includes a power output assembly or a power converter assembly. The movable portion 42 is formed by an end body extending from one end of the linear motor drive mechanism or is a structure mounted at one end of the linear motor drive mechanism, one end of the connection rod 5 is connected to the power output assembly or the power converter assembly of the linear motor drive mechanism, and the power output assembly or the power converter assembly drives the connection rod 5 to reciprocate to control the movable wall 22 to reciprocate. Specifically, the linear motor drive mechanism includes a linear motor, the power output assembly or the power converter assembly is a slidable plate disposed on the linear motor, and one end of the connection rod 5 is fixedly connected to the slidable plate.

It is apparent that the embodiments described above are only exemplary ones, but not all embodiments of the present disclosure, and that the attached drawings illustrate exemplary embodiments of the present disclosure but do not limit the scope of the present disclosure. The present disclosure may be embodied in many different forms and, on the contrary, these embodiments are provided for thorough and complete understanding of the present disclosure. Although the present disclosure has been described in detail with reference to the above embodiments, those skilled in the art will be able to make modifications to the technical solutions disclosed in the specific embodiments or make equivalent substitutions for some of the technical features. Any equivalent structure made based on the specification and accompanying drawings of the present disclosure, even if being directly or indirectly applied to some other related technical fields, shall all fall within the protection scope of the present disclosure.

What is claimed is:

1. A multifunctional massage device, comprising:

a housing;

a massage portion, capable of being protruded from the housing or being recessed into the housing;

a drive mechanism, disposed in the housing, wherein an output end of the drive mechanism is connected to the massage portion, and the drive mechanism is configured to drive the massage portion to reciprocate; and a telescope mechanism, disposed in the housing and connected to the drive mechanism, wherein the telescope mechanism is configured to drive the drive mechanism to telescope in the housing, and drive, by the drive mechanism, the massage portion to transition between being protruded from the housing and being recessed into the housing; wherein the massage portion comprises a fixed circumferential wall, a movable wall, and a connection circumferential wall, wherein the connection circumferential wall is disposed between the fixed circumferential wall and the movable wall, and the fixed circumferential wall is connected to the telescope mechanism; and the multifunctional massage device further comprises a connection rod, wherein one end of the connection rod is connected to the movable wall, and an opposite end of the connection rod is connected to the drive mechanism, and the drive mechanism is configured to control, by the connection rod, the movable wall to reciprocate.

2. The multifunctional massage device according to claim 1, wherein the telescope mechanism comprises a telescope assembly and a movable portion, wherein the movable portion is slidably disposed on the telescope assembly and is fixedly connected to the drive mechanism, the telescope assembly is provided with a first limiting portion and a second limiting portion, and the telescope assembly is configured to drive the movable portion to slide.

3. The multifunctional massage device according to claim 2, wherein the telescope assembly comprises a first positioning tube and a second positioning tube, wherein an outer diameter of the first positioning tube is less than an inner diameter of the second positioning tube, the first positioning tube is mounted in the second positioning tube, the second positioning tube is clockwise or counterclockwise rotatable relative to the first positioning tube, the first limiting portion is disposed at one end of the first positioning tube, and the second limiting portion is disposed an opposite end of the first positioning tube;

wherein a first chute is arranged in the first positioning tube, the first chute being disposed between the first limiting portion and the second limiting portion, and a guide groove or a guide groove ring having a guide groove is arranged in the second positioning tube, wherein the movable portion is inserted into the first chute and is slidably mounted in the guide groove, and the movable portion is in a circular-shaft shape.

4. The multifunctional massage device according to claim 3, wherein the first chute is axially disposed along the first positioning tube, a length of the first chute is less than or equal to a spacing between the first limiting portion and the second limiting portion, a first corner that is circumferentially disposed along the first positioning tube is defined at an end, close to the first limiting portion, of the first chute, and a second corner that is circumferentially disposed along the first positioning tube is defined at an end, close to the second limiting portion, of the first chute, wherein one of the first corner and the second corner is clockwise circumferentially disposed along the first positioning tube, and the other of the first corner and the second corner is counterclockwise circumferentially disposed along the first positioning tube;

the drive mechanism is disposed in the first positioning tube; the second positioning tube is capable of clockwise or counterclockwise rotating relative to the first positioning tube and driving the movable portion to slide in both the first chute and the guide groove to drive the drive mechanism to move in the first positioning tube, and when the movable portion enters the first corner, the second positioning tube is capable of stopping rotating relative to the first positioning tube, and the drive mechanism is fixed at a corresponding position of the first limiting portion on the first positioning tube; and the second positioning tube is capable of clockwise or counterclockwise rotating relative to the first positioning tube and driving the movable portion to slide in both the first chute and the guide groove to drive the drive mechanism to move in the first positioning tube, and when the movable portion enters the second corner, the second positioning tube is capable of stopping rotating relative to the first positioning tube, and the drive mechanism is fixed at a corresponding position of the second limiting portion on the first positioning tube; and when the drive mechanism is fixed at the corresponding position of the first limiting portion on the first positioning tube, the massage portion is protruded from the housing; and when the drive mechanism is fixed at the corresponding position of the second limiting portion on the first positioning tube, the massage portion is recessed into the housing.

5. The multifunctional massage device according to claim 3, further comprising a second first chute, a second movable portion and a second guide groove, wherein an opening extending to the first limiting portion is arranged in at least one of the two first chutes, wherein the two movable portions are symmetrically arranged, wherein the two guide grooves are symmetrically arranged, and each guide groove is a spiral guide groove which spirally extends from one end of the second positioning tube to an opposite end of the second positioning tube; and the first positioning tube is made of an elastic material, a diameter of each movable portion is less than a width of each first chute, a length of each movable portion is greater than a thickness of a wall thickness of the first positioning tube, and the length of each movable portion is less than or equal to a sum of a wall thickness of the first positioning tube and a depth of one of the two guide grooves.

6. The multifunctional massage device according to claim 3, wherein the first limiting portion and the second limiting portion are disposed on an outer periphery of the first positioning tube, and are radially protruded from the first positioning tube; an annular limiting groove engageable with the first limiting portion of the first positioning tube is disposed on an inner wall at one end of the second positioning tube, and when the first positioning tube is mounted in the second positioning tube, the first limiting portion is configured to be nested into the annular limiting groove, and the second limiting portion is configured to be abutted against one end, facing away from the annular limiting groove, of the second positioning tube; and a length of the second positioning tube is less than a length of the first positioning tube, and when the first positioning tube is mounted in the second positioning tube, the second limiting portion of the first positioning tube is configured to be exposed from the second positioning tube.

7. The multifunctional massage device according to claim 3, wherein the fixed circumferential wall is cladding connected to one end of the second positioning tube, radial snaps are disposed on an outer periphery at one end, connected to the fixed circumferential wall, of the second positioning tube, the radial snaps being connected to define an annular snap;

a connection hole is arranged in the movable wall, the connection hole being configured to allow the connection rod to be inserted therein, wherein an insertion end of the connection rod is engageable with the connection hole;

when the massage portion is recessed into the housing, at least one first chamber is defined in the massage portion, the fixed circumferential wall defines an opening of the first chamber, the movable wall defines a bottom of the first chamber, and the connection circumferential wall defines a chamber wall of the first chamber between the fixed circumferential wall and the movable wall; wherein the opening of the first chamber is greater than the bottom of the first chamber;

snaps facing oppositely from the opening are disposed on an outer periphery of the opening, where the fixed circumferential wall is disposed, of the first chamber; wherein the snaps are connected to define an annular snap fastener, wherein the annular snap fastener has an inwardly radial chamfer, and each respective snap is tightly inlaid into the radial chamfer of the annular snap fastener; and an extension portion is disposed on the fixed circumferential wall in a direction facing towards the opening of the first chamber, and an extended circumferential wall is defined.

8. The multifunctional massage device according to claim 2, wherein the drive mechanism is an electromagnetic drive mechanism, the electromagnetic drive mechanism comprising a cylindrical bobbin, a coil element disposed on an outer periphery of the cylindrical bobbin, and a moving magnet mounted in an inner cavity of the cylindrical bobbin and reciprocating therein; wherein one end of the connection rod is directly or indirectly connected to the moving magnet, the moving magnet is configured to drive the connection rod to reciprocate to control the movable wall to reciprocate; and wherein the movable portion is formed by an end body extending from one end of the cylindrical bobbin or is a structure mounted at one end of the cylindrical bobbin.

9. The multifunctional massage device according to claim 1, wherein the drive mechanism is a rotary motor drive mechanism, wherein the movable portion is formed by an end body extending from one end of the rotary motor drive mechanism or is a structure mounted at one end of the rotary motor drive mechanism, wherein one end of the connection rod is connected to drive the connection rod to reciprocate to control the movable wall to reciprocate.

10. The multifunctional massage device according to claim 1, wherein the drive mechanism is a linear motor drive mechanism, wherein the movable portion is formed by an end body extending from one end of the linear motor drive mechanism or is a structure mounted at one end of the linear motor drive mechanism, wherein one end of the connection rod is connected to the linear motor drive mechanism to drive the connection rod to reciprocate to control the movable wall to reciprocate.

11. The multifunctional massage device according to claim 1, wherein the telescope mechanism comprises a motor, a lead screw, a slidable support, and a movable portion, wherein the motor is connected to the lead screw, the drive mechanism is connected to a nut seat on the lead screw, a second chute is arranged in the slidable support, and the movable portion is slidably disposed in the second chute and is fixedly connected to the drive mechanism.

12. The multifunctional massage device according to claim 1, wherein the drive mechanism is an electromagnetic drive mechanism, which comprises a cylindrical bobbin, a coil element disposed on an outer periphery of the cylindrical bobbin, and a moving magnet mounted in an inner cavity of the cylindrical bobbin and reciprocating therein, wherein one end of the connection rod is directly or indirectly connected to the moving magnet, the moving magnet is configured to drive the connection rod to reciprocate to control the movable wall to reciprocate, wherein the telescope mechanism comprises a movable portion which is formed by an end body extending from one end of the cylindrical bobbin.

13. The multifunctional massage device according to claim 2, wherein the drive mechanism is an electromagnetic drive mechanism, which comprises a cylindrical bobbin, a coil element disposed on an outer periphery of the cylindrical bobbin, and a moving magnet mounted in an inner cavity of the cylindrical bobbin and reciprocating therein, wherein one end of the connection rod is directly or indirectly connected to the moving magnet, the moving magnet is configured to drive the connection rod to reciprocate to control the movable wall to reciprocate, wherein the telescope mechanism comprises a movable portion which is a structure mounted at one end of the cylindrical bobbin.

* * * * *